(12) United States Patent
Srinivas (10) Patent No.: US 7,269,654 B2
(45) Date of Patent: Sep. 11, 2007

(54) SYSTEM AND METHOD FOR ENHANCING A SERVER'S ABILITY TO WITHSTAND A "SYN FLOOD" DENIAL OF SERVICE ATTACK

(75) Inventor: Nk Srinivas, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 10/927,803

(22) Filed: Aug. 27, 2004

(65) Prior Publication Data

US 2005/0027872 A1 Feb. 3, 2005

Related U.S. Application Data

(63) Continuation of application No. 09/602,431, filed on Jun. 23, 2000, now Pat. No. 6,823,387.

(51) Int. Cl.
*G06F 15/16* (2006.01)
(52) U.S. Cl. ............... 709/227; 709/203; 709/217; 709/219
(58) Field of Classification Search ........ 709/200–202, 709/217–229
See application file for complete search history.

(56) References Cited

U.S. PATENT DOCUMENTS

| | | | |
|---|---|---|---|
| 5,892,903 A | 4/1999 | Klaus | |
| 5,958,053 A | 9/1999 | Denker | |
| 5,963,915 A | 10/1999 | Kirsch | |
| 6,032,260 A | 2/2000 | Sasmazel et al. | |
| 6,205,481 B1 | 3/2001 | Heddaya et al. | |
| 6,256,664 B1 | 7/2001 | Donoho et al. | |
| 6,308,238 B1 | 10/2001 | Smith et al. | |
| 6,314,468 B1 | 11/2001 | Murphy et al. | |
| 6,367,009 B1 | 4/2002 | Davis et al. | |
| 6,425,014 B1 | 7/2002 | Aiken, Jr. et al. | |
| 6,823,387 B1 * | 11/2004 | Srinivas ............... | 709/227 |

OTHER PUBLICATIONS

Grice, Corey, How a Basic Attack Crippled Yahoo, *at* http://news.cnet.com/news/0-1005-202-1544455.ht5ml, 2 pages (last visited Jun. 8, 2000).
Sandoval, Greg and Troy Wolverton, Leading Web Sites Under Attack, *at* http://news.cnet.com/news/0-1007-202-1545348.html, 3 pages (last visited Jun. 8, 2000).

(Continued)

*Primary Examiner*—Moustafa Meky
(74) *Attorney, Agent, or Firm*—Wolf, Greenfield & Sacks, P.C.

(57) ABSTRACT

A method of enhancing a server's ability to withstand a SYN flood type denial of service attack is presented. Modifications to the TCP/IP layer of a server reduce the amount of system resources that are allocated, and the amount of CPU overhead that is required to process a connection request until the TCP/IP three-way handshake is completed to verify the presence of a legitimate client. Specifically, the TCP/IP layer allocates a small TCP control block (TCB) of a size sufficient only to service the connect request upon receipt of the SYN packet. A full TCB is not allocated until the connection is completed. Further, the TCP/IP layer delays notification to the socket layer of the receipt of the SYN packet until after the connection is completed. Finally, the route information of the connection is not cached until after the connection is completed.

8 Claims, 4 Drawing Sheets

OTHER PUBLICATIONS

CNET News.com Staff, How a "Denial of Service" Attack Works, *at* http://news.cnet.com/news/0-1007-202=1546362.html, 1 page (last visited Jun. 8, 2000).

Jacobus, Patricia, White House Calls Experts to Address Cyber Attacks, *at* http://news.cnet.com/news/0-1—5-202-1547509.html, 1 page (last visited Jun. 8, 2000).

The Associated Press, FBI Site Struck by Web Attack, *at* http://news.cnet.com/news/0-1005-20201558533.html, 1 page (last visited Jun. 8, 2000).

CERT Advisory, Vulnerabiliyt in Certain TCP/IP Implementations, *at* ftp://info.cert.org/pub/cert_advisories/CA-98-13-tcp-denial-of-service, 4 pages, (last visited Jun. 9, 2000).

CERT Advisory, TCP SYN Flooding and IP Spoofing Attacks, *at* ftp://info.cert.org/pub/cert_advisories/CA-96,21.
tcp_syn_flooding, 8 pages (last visited Jun. 9, 2000).

Internet Server Unavailable Because of Malicious SYN Attacks, *at* ftp://ftp/microsoft.com/buyssys/win . . . xes-postSP5/syn-attack/q142641.txt, 5 pages (last visited Jun. 7, 2000).

Ann Harrison, *Firm Nabs Cracker With Intrusion Detection Tool*, 33, Computerworld, Aug. 23, 1999, at 59.

Laura DiDio, *Internet Security Holes Widen*, 32, Computerworld, Mar. 2, 1998, at 37-39.

*Hackers Used Variety of Tools, Officials Say*, KRTBN (Knight-Ridder Tribune Business News), Feb. 11, 2000.

*Axent Increases Flexibility of Security Products*, ENT (Boucher Communications), Feb. 9, 2000, at 5, 2, 35.

\* cited by examiner

SYSTEM AND METHOD FOR ENHANCING A SERVER'S ABILITY TO WITHSTAND A "SYN FLOOD" DENIAL OF SERVICE ATTACK

CROSS-REFERENCE TO RELATED PATENT APPLICATIONS

This patent application is a continuation of U.S. patent application Ser. No. 09/602,431, filed Jun. 23, 2000 now U.S. Pat. No. 6,823,387, the teachings and disclosure of which are hereby incorporated in their entireties by reference thereto.

TECHNICAL FIELD

This invention relates generally to systems and methods for improving a server's ability to withstand hacker attacks when connected to a computer network such as the Internet, and more particularly to systems and methods for improving a server's ability to withstand a SYN flood denial of service attack.

BACKGROUND OF THE INVENTION

Despite early skepticism, businesses have now fully embraced the Internet as a vehicle critical to the success of their continued operations. The explosion of e-commerce and the emergence of business to business (B2B) technologies and industry utilization, as well as the proliferation of personal computers (PCs) have galvanized the business mindset and the consuming public to the use of the Internet as an everyday tool for commerce. The explosion of such use has pushed the limits of Internet technology faster and further than heretofore thought possible. Unfortunately, such explosion has also brought forth an unsavory element know as hackers that threatens to bring down, or at least hobble this new e-commerce business paradigm that is otherwise beginning to flourish.

One technique that these hackers have employed against Web servers is known as a SYN flood denial of service attack. This type of attack is based on the realization by the hackers that many corporate Web sites are getting millions of hits per day, and that many servers are not able to respond crisply under these heavy loads. Even with only the volume of legitimate connect requests from actual potential customers, many servers often slow down network connections, deny service for potential customers, and even cause network failures due to the sheer volume of business which potential customers are attempting to conduct on the Web server. Such performance slow downs and denial of service problems tend to increase customer dissatisfaction, reduce sales, and diminish the possibility for repeat customers. These problems translate directly into lost sales and lost business opportunities. Unfortunately, this disruptive and non-productive environment appears to be exactly what many hackers are seeking, and have devised the SYN flood denial of service attack to foster its existence.

On Feb. 7, 8, and 9, 2000, this very type of denial of service attack was used to block access to legitimate users of many popular Websites, including Yahoo, Buy.com, eBay, CNN.com, Amazon.com, ZDNet, E*Trade, and Datek. This type of attack was also blamed for the Feb. 18, 2000, shutdown of the Federal Bureau of Investigation's (FBI) Website for several hours. Warnings of such attacks had been issued by the National Institute of Standards and Technology, Carnegie Mellon's Computer Emergency Response Team Center, and the FBI. However, despite the warnings and all the preparations and precautions taken by Internet Service Providers (ISPs) against such attacks, including rate filters, these Websites were still taken down for several hours. The failure of these Websites to protect against such a simple attack has called into question the vulnerability of Internet companies.

Spurred by the February 7-9 attacks, the President of the United States called an emergency Web security summit on February 15 with experts, government officials (including the Attorney General, the National Security Adviser, the Commerce Secretary, and others), and high-tech business leaders to address the concerns felt by the federal government and private industry about such attacks. This problem is so serious that the Attorney General of the United States of America has charged federal law enforcement officials to combine their resources to combat this type of online terrorism, enlisting the FBI and the National Infrastructure Protection Center (NIPC) in the fight. Further, the President has sent a budget request of $2 Billion to Congress for government efforts to combat computer sabotage by cyber-terrorists.

To understand these SYN flooding denial of service attacks, one must first understand the way the Internet, and the servers connected to the Internet, operate. Lying at the core of the explosion of the popularity and usage of the Internet is the Web server and browser communication protocol known as hypertext transfer protocol (HTTP). HTTP is the network protocol used to deliver virtually all files and other data, known collectively as resources, on the worldwide Web. These resources include HTML files, image files, query results, etc. This network protocol typically takes place through TCP/IP sockets. As with other network protocols, HTTP utilizes a client-server model. In this model, an HTTP client (such as a consumer) opens a connection and sends a request message to an HTTP server (e.g. a corporate Web server). Once the HTTP server has received the request from the client, it returns a response message, typically containing the resource that was requested by the client. For most typical browsing transactions on the Internet, the server then closes the connection after delivering the response. As such, HTTP is a stateless protocol, i.e. not maintaining any connection information between transactions.

Figure 7:
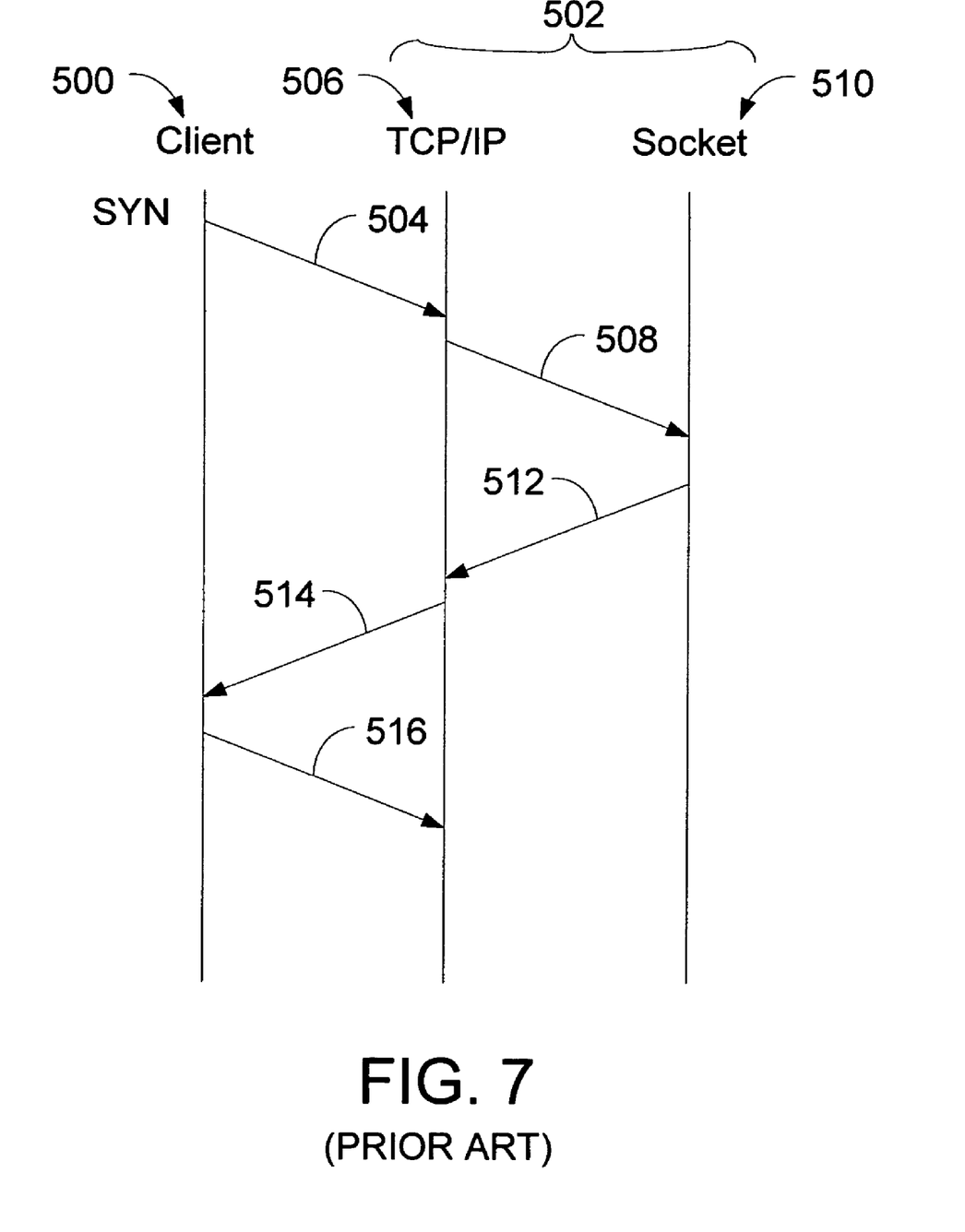
FIG. 7 is simplified message flow diagram illustrating the typical establishment of a TCP connection from a client to a server.

The actual mechanism of an HTTP transaction, such as a Web browsing connection, is shown in FIG. 7, which illustrates the basic request/response message flow between a client and a server. As may be seen from this simplified figure, a client 500 establishes a TCP connection to a server 502 by transmitting a connect request 504 (TCP SYN) to the server 502. This SYN 504 is received at the TCP/IP layer 506 within the server 502. This TCP/IP layer 506 then creates a TCP control block (TCB) to service the connection, and notifies 508 the connect request to the socket layer 510. The socket layer 510 then indicates 512 to the TCP/IP layer 506 the acceptance of this connect request. At this point, the TCP/IP layer 506 caches route information about the connection and client, and transmits an acknowledgment (TCP SYN+Ack) 514 to the client 500 who then completes the connect request by acknowledging (TCP Ack) 516 the server's acknowledgment of its initial request. This three-way handshake establishes the TCP connection over which the client 500 then transmits the HTTP "Get file" request to the server.

In a SYN flood attack, the hacker takes advantage of the server's allocation of resources and desire to establish a connection to service a client, recognizing that a server will attempt several times to establish a connection with a client before giving up the connection attempt and freeing the resources allocated to the connection. The abuse of the TCP/IP connect attempt arises at the point where the server system 502 has sent an acknowledgment (SYN-ACK 514) back to the client 500, but has not yet received the ACK 516 message. This is known as a half-open connection. The server 502 typically has built in it system memory a data structure describing all pending connections. Since this data structure is of finite size, it can be made to overflow by intentionally creating too many half-open connections.

Creating half-open connections is easily accomplished by the hacker with IP spoofing. The attacking system sends SYN messages 504 to the victim server system 502 that these appear to be legitimate, but in fact reference a client system that is unable to respond to the SYN-ACK messages 514. This means that the final ACK message 516 will never be sent to the victim server system 502. The half-open connections data structure on the victim server system 502 will eventually fill, at which point the system 502 will be unable to accept any new incoming connections until the table is emptied out. Normally there is a timeout associated with a pending connection, so the half-open connections will eventually expire and the victim server system 502 will recover. However, the attacking system can simply continue sending IP-spoofed packets requesting new connections faster than the victim system can expire the pending connections.

The time-out may be quite long due to the server's desire to establish a connection with the client so that it may service its request. Often, a server 502 will retransmit the SYN-ACK 5 times, doubling the time-out value after each retransmission. The initial time-out value is three seconds. Therefore, the server 502 will retransmit the SYN-ACK at 3, 6, 12, 24, and 48 seconds after the first transmission. After the last transmission of the SYN-ACK, the server waits 96 seconds before giving up on the connection attempt and deallocating the resources that were allocated earlier for the connection. In this example, the server has tied up the allocated resources for a total of 189 seconds. In most cases, the victim of such an attack will have difficulty in accepting any new incoming network connections. In these cases, the attack does not affect existing incoming connections or the ability to originate outgoing network connections. However, in some cases, the system may exhaust memory, crash, or be rendered otherwise inoperative.

SUMMARY OF THE INVENTION

The system and method of the invention increases the robustness of a server coupled to the Internet by protecting against, or at least making the server less susceptible to and therefore better able to withstand, a SYN flood attack. This is accomplished by instituting, preferably, three changes to the server performance in processing the SYN connect request, although improved performance is realized with each, alone or in combination. First, the system of the invention minimizes the involvement of any layer other than the TCP/IP layer by delays informing the socket layer about the connection request arrival (SYN packet) until the three-way handshake is completed. That is, the socket layer is only involved once a legitimate user has responded to the SYN-ACK, which significantly reduces the overhead and resource allocation otherwise associated with such notification and involvement of the socket layer.

The system and method of the invention further enhances the server's ability to withstand a SYN flood attack by delaying the caching of route information for the client until the three-way handshake is completed. In this way, the route cache holds only the routing information of legitimate connections, thereby minimizing the size of this cache and the time it takes to access any one connection's information stored therein. A third modification to the server's performance further enhances its ability to continue to service legitimate connection requests during such an attack. Under this third modification, the server allocates only a small (approximately ¼ size) TCP Control Block, (TCB) to handle the SYN state until the three-way handshake is completed. Previously, the TCB was allocated for each connection at the time of the connect request. The size of the TCB was that required to fully service the connection, even though the connection had not yet been fully acknowledged. The smaller TCB of the instant invention is sized to hold only that amount of information that is necessary to establish the connection. Once established, the rest of the TCB is allocated.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
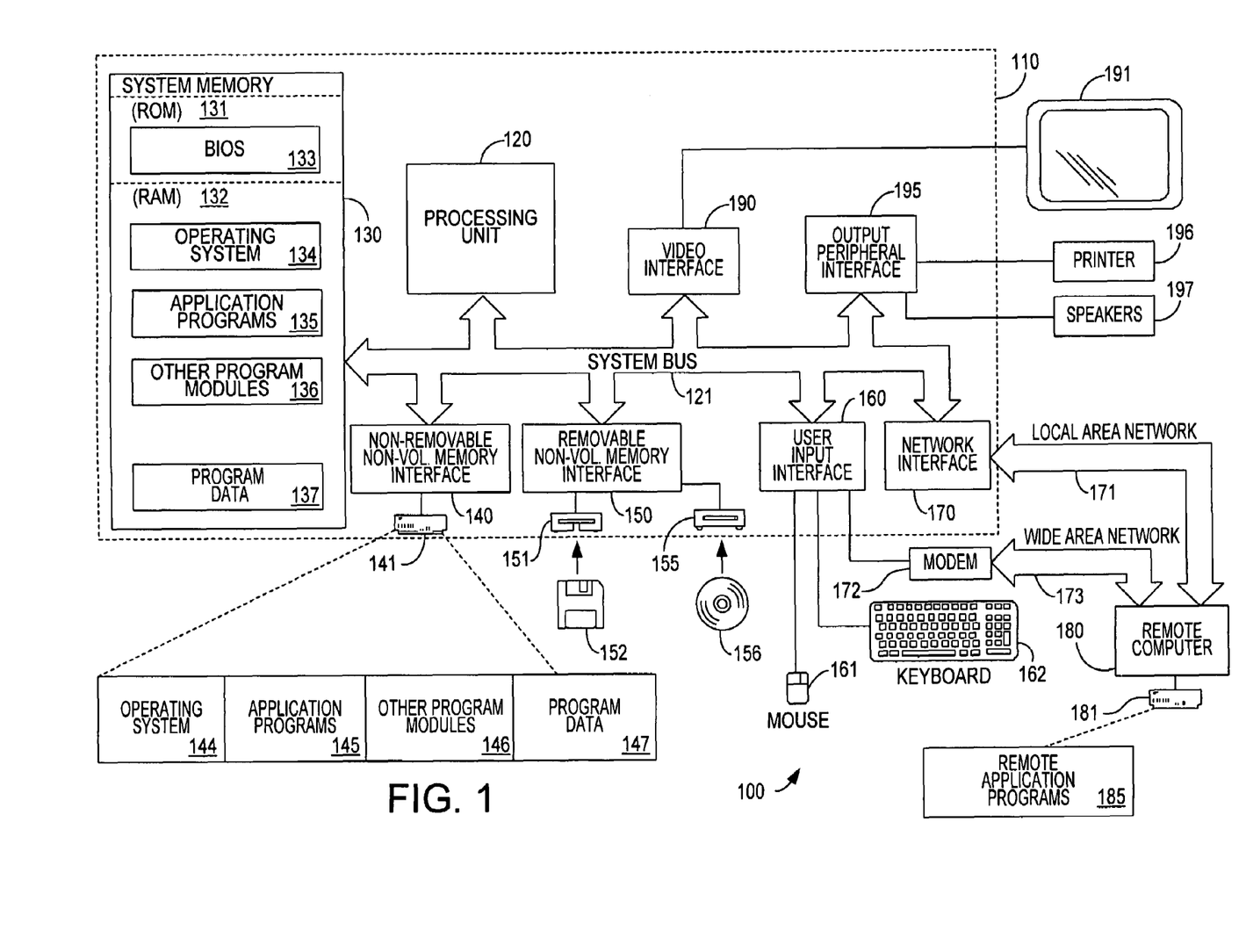
FIG. 1 is a block diagram generally illustrating an exemplary computer system on which the present invention may reside.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In the context of a networked environment, such as that provided via the Internet, wherein transactions are typically characterized as client/server transactions, the systems and methods of the invention are particularly well suited for application on the server side. However, since a server of one transaction may be the client of another, the use of the term server should be taken as a functional designation in a particular transaction. Therefore, as will be recognized by one skilled in the art, the systems and methods of the invention may be embodied in both traditional client machines as well as traditional server machines. Indeed, the systems and methods of the invention may be practiced in a variety of environments that require or desire the performance enhancements provided by these systems and methods.

Figure 2:
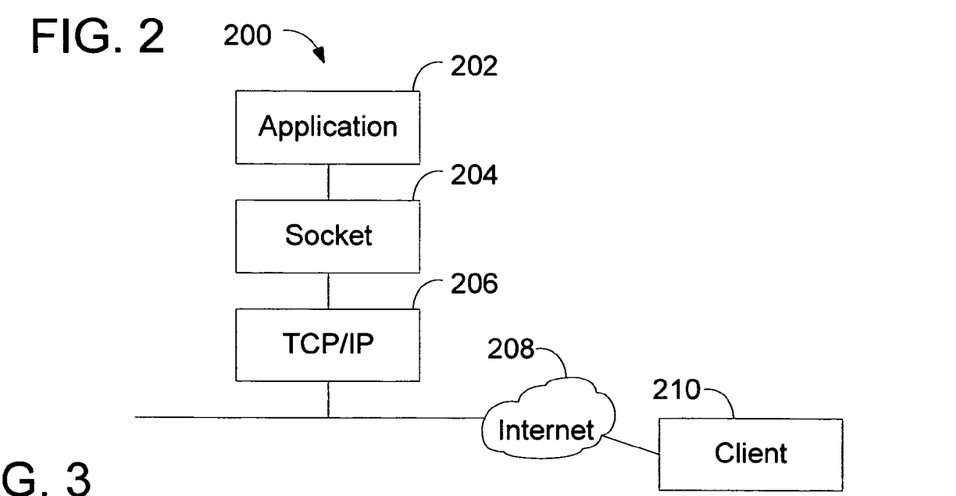
FIG. 2 is a simplified network architecture diagram for a server coupled via the Internet to a client.

As will be recognized by those skilled in the art, FIG. 2 illustrates a simplified architecture of a typical server 200 for which the system and method of the invention are particularly well suited. Conceptually within this typical server 200, an application layer 202 exists above a socket layer 204 which, in turn, exists above the TCP/IP layer 206. The TCP/IP layer 206 is then coupled or connected to a network, such as the Internet 208. This network 208 provides the ability for multiple remote clients 210 to access or send requests to and receive responses from the server 200. Unlike typical servers however, the TCP/IP layer 206 of server 200 provides different functionality than the typical TCP/IP layer in accordance with the teachings of the instant invention to allow the server 200 to better withstand a SYN flood type denial of service attack.

Figure 3:
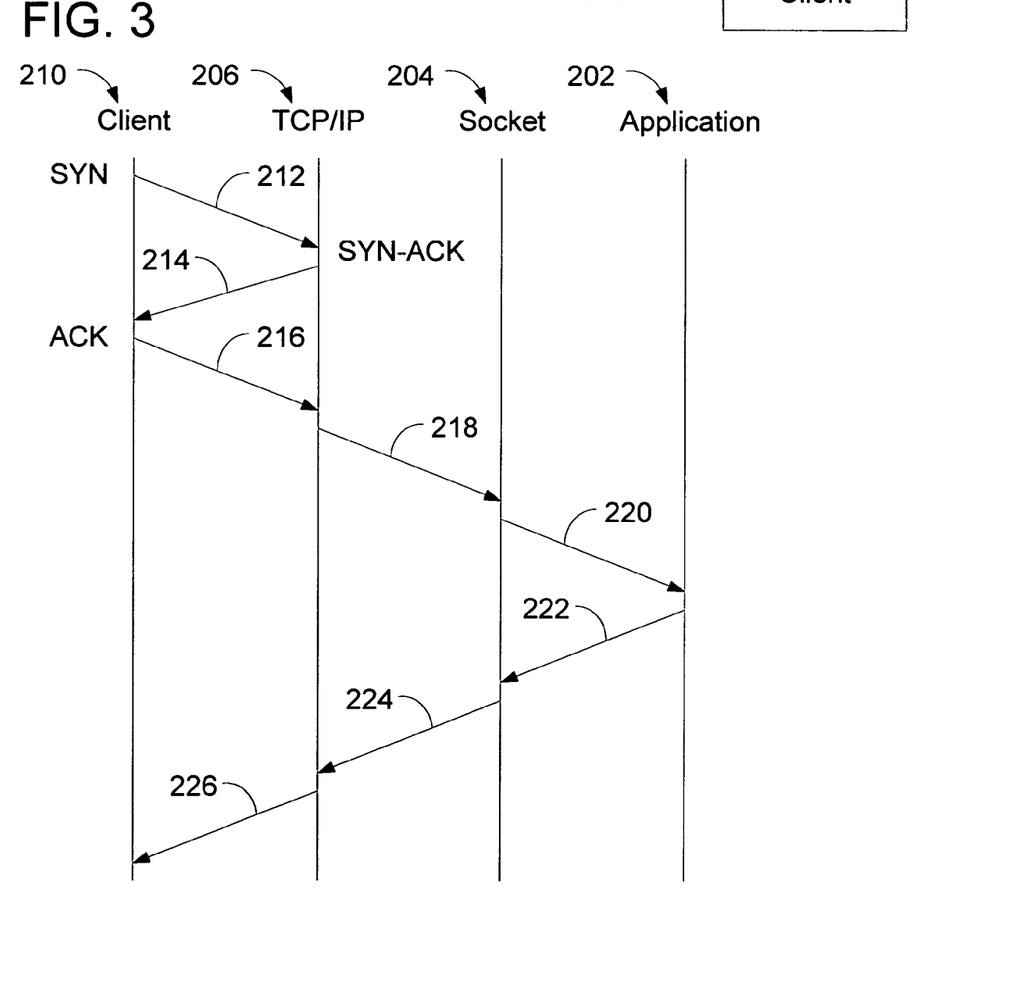
FIG. 3 is a simplified message flow diagram illustrating the establishment of a TCP connection from a client to a server in accordance with the teachings of the instant invention.

Specifically, and with reference to FIG. 3, upon receipt of a client generated TCP SYN 212 requesting the establishment of a connection, the TCP/IP layer 206 acknowledges directly the TCP SYN 212 with a SYN-ACK 214 without notifying the socket layer 204. This saves processor overhead that would otherwise be required to communicate the receipt of this request to the socket layer 204 and the subsequent notification by the socket layer 204 to the application layer 202. Instead, the TCP/IP layer 206 waits until the completion of the three-way handshake (upon receipt of the ACK 216) before notifying 218 the socket layer 204. This also delays the notification from the socket layer 204 to the application layer 202 and the associated allocation of resources at each level and processor overhead generated thereby. In this way, the receipt of TCP SYN packets with spoofed IP source addresses are never communicated to the socket layer 204 or application layer 202 since they will not complete the handshake procedure. Legitimate requests will, however be communicated 218 to the socket layer 204 and to 220 the application layer 202 for servicing since the actual legitimate client will acknowledge the SYN-ACK 214 with an ACK 216. Once the socket layer 204 and application layer 202 has been notified 218, 220 of the arrival of the connection, the client request can then be serviced 222, 224 and have the TCP/IP layer 206 transmit 226 the requested resource to the client 210.

To further conserve server resources and allow the server to continue to service legitimate clients that have already made connection thereto, the TCP/IP layer 206 also delays caching route information for the client from the TCP SYN packet until the three-way handshake is completed. This keeps the route cache from becoming crowded with route information for the spoofed TCP SYN packets, and therefore speeds the servicing of legitimate connections. This is enabled by minimizing the amount of route cache information, and therefore the amount of non-paged pool memory, that must be processed to find this information for any one legitimate connection.

In prior systems, the route information was cached at the time the TCP/IP layer 506 would send the SYN-ACK 514 to the client 500. This route information would form a cache chain with each of these route entries. Of course, if the TCP SYN packet had a spoofed IP address, the caching of the route information for this spoofed client served only to make the route cache larger (the chain longer) and more time consuming to processes. To service a legitimate client, the cache chain must be searched to find that client's route information. The longer the chain, the longer the time it takes to find this information. This problem is eliminated with the system of the instant invention since the chain is now only constructed from the route information of legitimated clients.

The TCP/IP layer 206 of the instant invention further enhances the ability of a server to withstand a SYN flood attack by minimizing the size and amount of information that is stored in the TCP control block (TCB) for the connection request. Previous systems created a full size TCB capable of fully servicing a legitimate client upon receipt of the TCP SYN packet. This fact allowed the hackers to quickly consume all of the server's finite resources by sending multiple SYN packets, each of which were allocated a full TCB upon receipt.

With the system of the instant invention, the TCP/IP layer 206 now only allocates enough memory in the TCB to service the three-way handshake, reserving until after authentication the allocation of the remainder of the necessary memory in the TCB to fully service the actual connection to a client. In an exemplary embodiment, the TCB was reduced to less than approximately one-quarter of the full TCB. Information that may be stored in this small TCB is the remote's IP address and port number, preferably tagged with local IP address and port number, and the maximum transmit unit (MTU) of the remote.

While the system and methods of the invention have been described with regard to a TCP/IP layer 206 within a server 200 that utilizes a small TCB, that delays notification until confirmation, and that delays route information caching, one skilled in the art will recognize that performance advantages are provided with each of these three improvements. Therefore, one skilled in the art will recognized that any one of the above described methods, taken alone or in combination, will enhance the ability of a server to withstand a SYN flood type denial of service attack.

Figure 4:
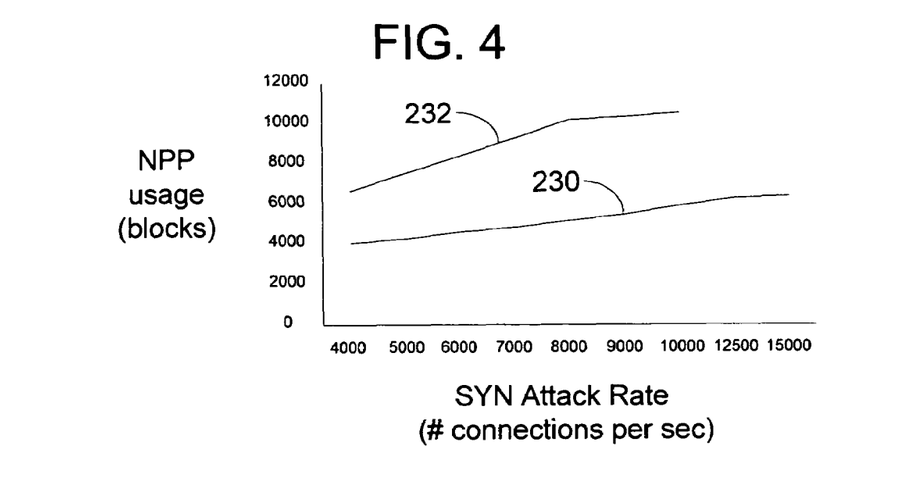
FIG. 4 is a graphical illustration of server performance measured in non-paged pool usage versus the SYN attack rate for servers incorporating the systems and methods of the invention and servers that do not.

While other combinations are possible, FIG. 4 illustrates the performance enhancement of two servers incorporating different combinations of the methods of the invention over a typical server. Specifically, FIG. 4 illustrates the non-paged pool (NPP) memory usage in blocks versus the SYN attack rate in number of connections per second for a server that includes all of the above described methods on line 230, and a server that includes the above described methods except for the small TCB allocation on line 232. As may be seen from this graph, the NPP memory usage is significantly reduced from that required by a typical server at all rates of attack.

Figure 5:
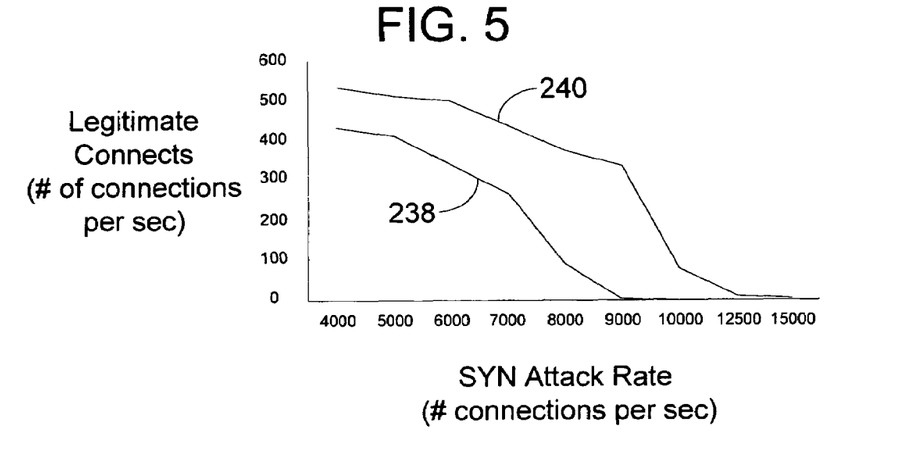
FIG. 5 is a graphical illustration of server performance measured in the number of legitimate client connections per second versus the SYN attack rate for servers incorporating the systems and methods of the invention and servers that do not.

FIG. 5 illustrates another measure of the enhancements provided by the system and methods of the instant invention, specifically the number of legitimate connections that may be serviced per second versus the SYN attack rate measured in number of connections per second. Line 238 illustrates the ability of a server having all of the improvements described above except for the small TCB, and line 240 illustrates the ability of a server having all of the above described improvements.

Figure 6:
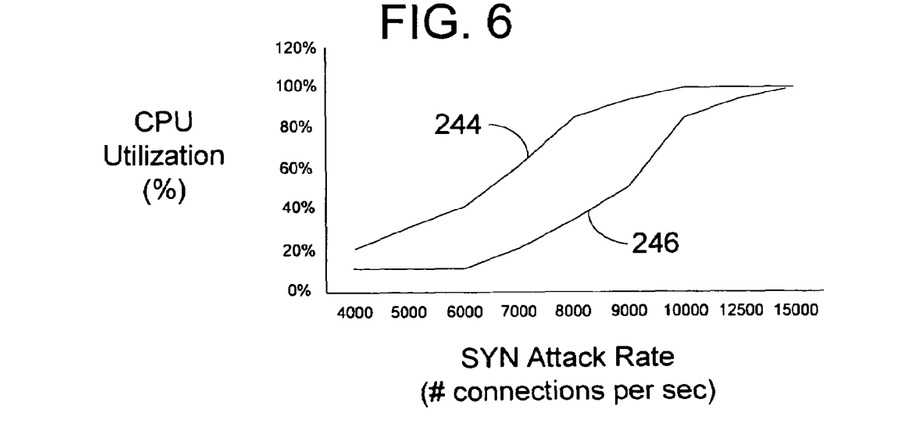
FIG. 6 is a graphical illustration of server performance measured in CPU utilization versus the SYN attack rate for servers incorporating the systems and methods of the invention and servers that do not.

FIG. 6 illustrates CPU utilization in percent versus the SYN attack rate measured in number of connections per second for the same exemplary servers. Line 242 illustrates the CPU utilization of an exemplary server having all of the improvements described above except for the small TCB, and line 240 illustrates the CPU utilization of a server having all of the above described improvements.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method of establishing a TCP/IP connection between a client and a server that the server may better withstand a SYN flood attack, the method comprising:
   receiving a TCP SYN packet requesting the formation of a TCP/IP connection from a client, the TCP SYN including a source IP address of the client;
   allocating a small TCP control block (TCB) in memory to service a TCP/IP three-way handshake; and
   transmitting a TCP-ACK to the IP address of the client; and
   receiving an ACK from the client in response to the TCP-ACK, the receipt of the ACK completing an establishment of a TCP connection; and
   thereafter notifying a socket layer of the TCP connection.

2. The method of claim 1, further comprising caching route information for the client performed after receiving the ACK from the client.

3. The method of claim 2, further comprising allocating a full TCB in memory to service the TCP connection after receiving the ACK from the client.

4. The method of claim 1, further comprising allocating a full TCB in memory to service the TCP connection after receiving the ACK from the client.

5. The method of claim 1, wherein the step of allocating a small TCP control block (TCB) in memory to service a TCP/IP three-way handshake comprises allocating a small TCB in memory of size sufficient only to service the TCP/IP three-way handshake.

6. The method of claim 1, wherein the step of allocating a small TCP control block (TCB) in memory to service a TCP/IP three-way handshake comprises allocating a small TCB in memory of size insufficient to service the TCP connection.

7. The method of claim 1, further comprising:
   receiving an ACK from the client in response to the TCP-ACK, the receipt of the ACK completing an establishment of a TCP connection; and
   thereafter allocating a full TCB in memory to service the TCP connection.

8. A method of establishing a TCP/IP connection between a client and a server that the server may better withstand a SYN flood attack, the method comprising:
   receiving a TCP SYN packet requesting the formation of a TCP/IP connection from a client, the TCP SYN including a source IP address of the client;
   allocating a small TCP control block (TCB) in memory to service a TCP/IP three-way handshake; and transmitting a TCP-ACK to the IP address of the client;
further comprising:
receiving an ACK from the client in response to the TCP-ACK, the receipt of the ACK completing an establishment of a TCP connection;
thereafter caching route information for the client; and
further comprising notifying a socket layer of the TCP connection performed after receiving the ACK from the client.

* * * * *